United States Patent
Nie et al.

(10) Patent No.: US 6,180,197 B1
(45) Date of Patent: Jan. 30, 2001

(54) MULTI-LAYER TUBING HAVING AT LEAST ONE INTERMEDIATE LAYER FORMED FROM A POLYAMIDE/POLYKETONE ALLOY

(75) Inventors: Tao Nie, Macomb; Duane Pontbriand, Metamora; David Bensko, Oscoda, all of MI (US)

(73) Assignee: ITT Manufacturing Enterprises, Inc., Wilmington, DE (US)

( * ) Notice: Under 35 U.S.C. 154(b), the term of this patent shall be extended for 0 days.

(21) Appl. No.: 09/023,739

(22) Filed: Feb. 13, 1998

(51) Int. Cl.$^7$ .......................... B32B 27/28; B32B 27/32; B32B 27/34; F16L 11/04
(52) U.S. Cl. .................... 428/36.91; 428/474.7; 428/477.4; 428/517; 428/525; 138/137; 138/141
(58) Field of Search .................. 428/36.4, 36.91, 428/35.9, 474.4, 474.7, 477.4, 516, 517, 524, 525; 138/137, 138, 141

(56) References Cited

U.S. PATENT DOCUMENTS

| 3,070,132 | 12/1962 | Sheridan | ............... 138/118 |
| 3,166,688 | 1/1965 | Rowand et al. | ............... 317/2 |

(List continued on next page.)

FOREIGN PATENT DOCUMENTS

| 3821723 | 9/1989 | (DE) . |
| 4001125 | 12/1990 | (DE) . |
| 4001126 | 12/1990 | (DE) . |
| 9007303 | 12/1990 | (DE) . |
| 3942354 | 6/1991 | (DE) . |
| 0465252 | 1/1992 | (EP) . |
| 0551094 | 7/1993 | (EP) . |
| 0569101 | 11/1993 | (EP) . |
| 2577168 | 8/1986 | (FR) . |
| 2577564 | 8/1986 | (FR) . |
| 2204376 | 11/1988 | (GB) . |
| 2211266 | 6/1989 | (GB) . |
| 93/25835 | 12/1993 | (WO) . |
| 95/30105 | 11/1995 | (WO) . |
| 97/44186 | 11/1997 | (WO) . |

OTHER PUBLICATIONS

Shell Chemical Company, "Carilon Polymers", SC:2444–96, Aug. 1996.*
James M. Margolis, *Conductive Polymers and Plastics*, ch. 4, pp. 119–124 (Chapman & Hall, New York).
Central Glass Co., Ltd., *Flexible Fluoroplastic CEFRAL SOFT*, pp. 1–20.
Kirk–Othmer, *Encyclopedia of Chemical Technology*, 3d ed., vol. 18, pp. 406–425 (John Wiley & Sons, New York) (1982).

(List continued on next page.)

*Primary Examiner*—Ellis Robinson
*Assistant Examiner*—John J. Figueroa
(74) *Attorney, Agent, or Firm*—Robert P. Seitter

(57) ABSTRACT

A multi-layer tube suitable for use in a motor vehicle system to transport fluids containing hydrocarbons such as would be found in a fuel line, a vapor return line or a vapor recovery tube having a first layer radially disposed innermost made up of an extrudable melt-processible thermoplastic material selected from the group consisting of aromatic polyketones, aliphatic polyketones and mixtures thereof, and second layer made up of an extrudable, melt-processible thermoplastic material capable of sufficiently permanent laminar adhesion with the first layer so as to prevent delamination between the first and second layers during a desired lifetime of the tube, and a third layer overlying the first layer made up of a melt-processible thermoplastic material such as polyamides, high density polyethylenes and mixtures thereof. The tubing of the present invention may, optionally, include additional layers interposed between the respective layers or may include additional layers which overlie the exterior surface of the second layer.

31 Claims, 2 Drawing Sheets

U.S. PATENT DOCUMENTS

| | | | |
|---|---|---|---|
| 3,473,087 | 10/1969 | Slade | 317/2 |
| 3,561,493 | 2/1971 | Maillard et al. | 138/141 |
| 3,828,112 | 8/1974 | Johansen et al. | 174/47 |
| 3,907,955 | 9/1975 | Viennot | 264/105 |
| 4,243,724 | 1/1981 | Strutzel et al. | 428/474.7 |
| 4,244,914 | 1/1981 | Ranalli et al. | 264/515 |
| 4,272,585 | 6/1981 | Strassel | 428/413 |
| 4,273,798 | 6/1981 | Scheiber | 427/27 |
| 4,303,457 | 12/1981 | Johansen et al. | 156/149 |
| 4,330,017 | 5/1982 | Satoh et al. | 138/126 |
| 4,448,748 | 5/1984 | Radtke et al. | 420/514 |
| 4,601,948 | 7/1986 | Lancaster et al. | 428/349 |
| 4,614,208 | 9/1986 | Skarelius | 138/103 |
| 4,659,625 | 4/1987 | Decroly et al. | 428/412 |
| 4,675,780 | 6/1987 | Barnes et al. | 361/215 |
| 4,685,090 | 8/1987 | Krevor | 367/20 |
| 4,706,713 | 11/1987 | Sadamitsu et al. | 138/137 |
| 4,710,337 | 12/1987 | Nordstrom | 264/508 |
| 4,762,589 | 8/1988 | Akiyama et al. | 156/307.3 |
| 4,800,109 | 1/1989 | Washizu | 428/34.4 |
| 4,853,297 | 8/1989 | Takahashi et al. | 428/623 |
| 4,880,036 | 11/1989 | Kitami et al. | 138/137 |
| 4,887,647 | 12/1989 | Igarashi et al. | 138/126 |
| 4,907,625 | 3/1990 | Ito et al. | 138/126 |
| 4,944,972 | 7/1990 | Blembereg | 428/35.2 |
| 4,948,643 | 8/1990 | Mueller | 428/36.6 |
| 4,984,604 | 1/1991 | Nishimura | 138/126 |
| 4,990,383 | 2/1991 | Bergstrom et al. | 428/35.9 |
| 5,019,309 | 5/1991 | Brunnhofer | 264/103 |
| 5,038,833 | 8/1991 | Brunnhofer | 138/137 |
| 5,039,743 | 8/1991 | Machado | 525/92 |
| 5,043,389 | 8/1991 | Gergen et al. | 525/179 |
| 5,076,329 | 12/1991 | Brunnhofer | 138/137 |
| 5,084,518 | 1/1992 | George et al. | 525/184 |
| 5,112,692 | 5/1992 | Strassel et al. | 428/421 |
| 5,135,976 | 8/1992 | Van Helden et al. | 524/114 |
| 5,142,782 | 9/1992 | Martucci | 29/890.77 |
| 5,143,122 | 9/1992 | Adkins | 138/109 |
| 5,167,259 | 12/1992 | Brunnhofer | 138/137 |
| 5,170,011 | 12/1992 | Martucci | 174/47 |
| 5,219,002 | 6/1993 | Stenger et al. | 138/118.1 |
| 5,219,003 | 6/1993 | Kerschbaumer | 138/137 |
| 5,232,786 * | 8/1993 | Waters et al. | 428/475.8 |
| 5,258,213 | 11/1993 | Mugge et al. | 428/36.91 |
| 5,284,184 | 2/1994 | Noone et al. | 138/121 |
| 5,313,987 | 5/1994 | Rober et al. | 138/137 |
| 5,362,529 | 11/1994 | Mugge et al. | 428/35.7 |
| 5,362,570 | 11/1994 | Rober et al. | 428/475.2 |
| 5,373,870 | 12/1994 | Derroire et al. | 138/125 |
| 5,380,385 | 1/1995 | Derroire et al. | 156/149 |
| 5,383,087 | 1/1995 | Noone et al. | 361/215 |
| 5,389,410 | 2/1995 | Mugge et al. | 428/34.1 |
| 5,404,915 | 4/1995 | Mugge et al. | 138/137 |
| 5,425,817 | 6/1995 | Mugge et al. | 138/137 |
| 5,437,311 | 8/1995 | Reynolds | 138/115 |
| 5,449,024 | 9/1995 | Rober et al. | 428/421 |
| 5,472,784 | 12/1995 | Rober et al. | 428/36.91 |
| 5,474,822 | 12/1995 | Rober et al. | 428/36.91 |
| 5,478,620 | 12/1995 | Mugge et al. | 428/36.91 |
| 5,500,263 | 3/1996 | Rober et al. | 428/36.6 |
| 5,524,673 | 6/1996 | Noone et al. | 138/103 |
| 5,560,398 | 10/1996 | Pfleger | 138/121 |
| 5,566,720 | 10/1996 | Cheney et al. | 138/137 |
| 5,570,711 | 11/1996 | Walsh | 138/137 |
| 5,653,266 | 8/1997 | Reynolds et al. | 138/137 |
| 5,743,304 * | 4/1998 | Mitchell et al. | 138/127 |

OTHER PUBLICATIONS

Shell Chemical Company, *Kraton—Compounds Properties Guide*.

Shell Chemical Company, Kraton Thermoplastic Rubber—Processing & Fabricating Kraton Thermoplastic Rubber Compounds, pp. 1–26 (Apr. 1988).

Shell Chemical Company, *Kraton Rubber Automotive Compound Characteristics*.

Shell Chemical Company, *Kraton Thermoplastic Rubber—Typical Properties 1990*, pp. 1–11 (Feb. 1990).

Advanced Elastomer Systems, *Material Safety Data—Santoprene Thermoplastic Rubber FR Grades*, pp. 1–5 (Dec. 1, 1990).

Central Glass Co., Ltd., *Material Safety Data Sheet—XUA–2U*, pp. 1–2 (Mar. 18, 1991).

Shell Chemical Company, *Material Safety Data Sheet*, pp. 1, 3, 5 (Aug. 10, 1990).

SAE Standard, *Nonmetallic Air Brake System Tubing—SAE J844*, pp. 203–208 (Jun. 1990).

International Plastics Selector, *Plastics Digest—Thermoplastics and Thermosets*, ed. 14, vol. 2, pp. 216–219, 1283–1284 (1993).

EMS—American Grilon Inc., *EMS Engineering Polymers—Product Data Bulletin—GRILAMID L25FVS40—GRILAMID L25F10*.

Huls America Inc., *Product Information—Vestamid Nylon 12*.

Donald V. Rosato, David P. Di Mattia, & Dominick V. Rosato, *Designing with Plastics and Composites: A Handbook*, pp. 210–223 (Van Nostrand Reinhold, New York) (1991).

Advanced Elastomer Systems, *Santoprene Thermoplastic Rubber—Product Data Sheet—251–80* (Nov. 1991).

Advanced Elastomer Systems, *Santoprene Thermoplastic Rubber—Fluid Resistance*, pp. 1–12 (1992).

DSM Thermoplastic Elastomers Inc., *Sarlink 1000 Series—Material Safety Data Sheet*, pp. 1–4 (Jan. 14, 1992).

Novacor Chemicals Inc., *Sarlink Thermoplastic Elastomers—The Alternative TPEs*.

Novacor Chemicals Inc., *Data Sheet—Sarlink 1570—Fuel Resistant Thermoplastic Elastomer for Marine Hose Applications* (data sheets for other products included) (Nov. 1989).

ASTM, *Standard Specification for Zinc—5 Aluminum—Mischmetal Alloy (UNS Z38510) in Ingot Form for Hot–Dip Coatings*, pp. 669–670.

State of California—Air Resources Board, *Public Hearing to Consider Amendments . . . Regarding Evaporative Emissions Standards . . .* , pp. 1–2, A1–A4, B1–B43 (Aug. 9, 1990).

DuPont Corporation, *Tefzel Fluoropolymer—Safety in Handling and Use*, pp. 1–3, 20–21, 35–37.

Vichem Corporation, *Vinyl Compounds—Material Safety Data Sheet—V220–85E–7261* (May 1990).

International Search Report.

* cited by examiner

MULTI-LAYER TUBING HAVING AT LEAST ONE INTERMEDIATE LAYER FORMED FROM A POLYAMIDE/POLYKETONE ALLOY

FIELD OF THE INVENTION

The present invention relates to tubing for use in a motor vehicle. More particularly, the present invention relates to a multi-layer tube which can be employed for transporting hydrocarbon-containing fluids such as automotive fuel. Even more particularly, this invention relates to multi-layer tubing construction having enhanced characteristics of hydrocarbon non-permeability, integral layer lamination and performance durability. Such tubes would be employed in a fuel line or a vapor recovery line of a motor vehicle.

BACKGROUND OF THE INVENTION

Single layer fuel lines and vapor return lines of synthetic materials such as polyamides have been proposed and employed in the past. Fuel lines employing such materials generally have lengths of at least several meters. In order to fulfill their function, the material employed in the fuel line must be inert to the medium flowing through them and resistant to high and low temperatures and to mechanical loads. Once installed, it is important that the line not materially change during the length of operation either by shrinkage or elongation or as a result of the stresses to which the line may be subject during use.

Single layer tubes are not always capable of meeting the necessary requirements. Transport of materials containing aliphatic or aromatic chemicals can create undesirable disadvantages such as hydrocarbon permeation, dimensional changes or insufficient mechanical load bearing capacity.

It has become increasingly important that fuel lines be essentially impervious to hydrocarbon emissions due to hydrocarbon permeation through the tube itself. The permissible hydrocarbon emissions due to permeation through fuel lines is severely limited by federal and state regulations. Regulations in states such as California fix the total passive hydrocarbon emission for a vehicle at 2 g/m$^2$ per 24 hour period as calculated by evaporative emission testing methods outlined in Title 13 of the California Code of Regulations, Section 1976 as amended Sep. 26, 1991. To achieve the desired total vehicle emission levels, a hydrocarbon permeation level for fuel lines equal to or below 0.5 g/m$^2$ per 24 hour period is desirable. It is also necessary that the fuel line employed be impervious to interaction with corrosive materials present in the fuel such as oxidative agents and surfactants as well as additives such as methanol and ethanol.

In the past, various types of tubing have been proposed to address these concerns. Co-extruded multi-layer tubing has met with various levels of success. Such multi-layer tubing generally employs a relatively thick outer layer composed of a material resistant to the exterior environment. The innermost layer (or layers) is thinner and is composed of a material which is chosen for its ability to block diffusion of materials, such as aliphatic hydrocarbons, alcohols and other materials present in fuel blends, to the outer layer.

Alcohol and aromatic components in the fuel conveyed through the tube tend to diffuse through the tubing wall at rates different from any diffusion of aliphatic fuel components. It was feared that the resulting change in the composition of the liquid in the tubing would alter solubility thresholds of the tubing material to a degree sufficient to be able to crystalize monomers and oligomers of materials such as nylon 12 and nylon 11 into the liquid. It was feared that crystallized nylon precipitate would block fuel filters, fuel injectors and the like and would collect to limit the travel of the fuel pump or carburetor float as well as build up on critical control surfaces of the fuel pump.

In order to avoid this phenomenon, patents such as U.S. Pat. No. 5,076,329 to Brunhoffer disclosed a five-layer fuel line in which the inner fluid-contacting surface was composed of nylon 6. In U.S. Pat. No. 5,038,833 to Brunhoffer, a three layer fuel line was proposed in which a tube is formed having a co-extruded outer wall of nylon 11 or nylon 12, an intermediate alcohol barrier wall formed of ethylene vinyl alcohol copolymer and an inner water blocking wall formed of a polyamide such as nylon 11 or nylon 12. In DE 40 06 870, a fuel line was proposed in which an intermediate solvent barrier layer is formed of unmodified nylon 6.6 either separately or in combination with polyamide elastomers. The innermost layer is also composed of polyamides such as modified or unmodified nylon 6 while the outer layer is composed of either nylon 6 or nylon 12. UK 2 204 376A discloses a tube which has a thick outer layer composed of a polyamide such as nylon 6 or nylon 6.6 and/or nylon 11 or nylon 12 coextruded with an alcohol-resistant polyolefin, and a copolymer of propylene and maleic acid.

In certain situations, it has been found that multi-layer tube having an innermost layer composed of nylon 11 or nylon 12 can be employed without adverse effects. In U.S. Pat. No. 5,313,987, a multi-layer pipe is disclosed which has an outer polyamide layer and an intermediate layer formed from a mixture of a thermoplastic polyester such as polybutylene terepthalate and a compound having at least two isocyanate groups. The innermost layer may, optionally, be composed of a polyamide.

In all instances, it is necessary to provide proper uniform laminar adhesion between all layers of the multi-layer tubing while achieving appropriate permeation resistance. Thus, advances and innovations regarding bonding materials which can be successfully employed in permeation resistant multi-layer tubing would be highly desirable.

In many instances, it is also desirable to provide a tube which can address the phenomenon of the build up of electrostatic charge on the surfaces of the tubing body. Electrostatic charge is defined as electric charge on the surface of a body. In this instance, a fuel tube, which occurs when charges are created at a rate faster than they can be dissipated. A net charge imbalance results. The charge imbalance will continue to increase until a limiting event such as a spark discharge occurs. In multi-layer fuel tubing, the electric charge built up is derived from the passage of charged particles through tubing constructed from essentially nonconductive materials.

Spark discharges generally occur in one of three ways: (a) directly to ground (through air); (b) from one part of a component to another (through air); or (c) to ground through the walls of a component (by dielectric breakdown). If a spark discharge due to dielectric breakdown occurs, the energy released in the discharge event can melt, degrade or burn the polymeric material in the discharge path and produce a pinhole rupture. Once dielectric breakdown occurs, the insulative properties of the material are weakened and subsequent breakdowns will generally occur at lower electrical field strength. Any subsequent discharge or current flow will tend to occur along the more conductive path already created thereby enlarging the hole or rupture. If this occurs in multi-layer fuel tubing, the risk of tubing rupture is increased with associated increases in the danger of fire and/or explosion of flammable contents in the tubing.

Various patents discussed the problems of lamination strength, permeation resistance, and electrostatic discharge prevention. Among these are U.S. Pat. No. 5,383,087 to Noone et al which discloses a multi-layer polymeric tube having at least four layers in which an inner layer and an innermost electrostatic discharge layer preferably composed of a fluoroplastic are bonded to an outer layer composed of a thermoplastic material such as thermoplastic elastomers and polyamides. The bonding layer is preferably composed of thermoplastic made up of a polyvinyl fluoride compound and a polyamide.

U.S. Pat. No. 5,524,673 also to Noone et al, discloses various multi-layer tubing constructions having at least three layers in which an outer layer is composed of a thermoplastic material selected from the group consisting of thermoplastic elastomers, polyamides, and mixtures thereof. The inner fuel-contacting layers disclosed in this reference include fluoropolymers selected from the group consisting of polyvinylidine fluoride, polyvinyl fluoride, polychlorotrifluoroethylene, ethylene tetrafluoroethylene copolymers, graft copolymers of the preceding fluoroplastic materials together with a fluorine-containing compound such as copolymers of vinylidine fluoride and chlorotrifluoroethane. Alternately, the inner fuel-contacting layer can be composed of a thermoplastic material selected from the group consisting of thermoplastic elastomers, polyamides selected from the group consisting of nylon 12, nylon 11, nylon 6, and mixtures thereof. The materials specified for the intermediate bonding layer include certain fluoroplastic materials such as polyvinylidene fluoride and polyvinyl fluoride; non-fluoroplastics such as ethylene vinyl alcohol and polyvinyl acetate-urethane blends; and thermoplastic polyesters such as polybutylene terepthalate as well as the various blends discussed in Noone '087. In the multi-layer tubing discussed in U.S. Pat. No. 5,524,673, one of the layers may optionally be capable of dissipating electrostatic energy.

U.S. Pat. No. 5,460,771 to Mitchell et al discloses a process for making corrugated multi-layer tubing in which the outer layer can be made from any number of specified thermoplastic materials while the inner fuel contacting layer is made from either a fluoroplastic material or a material which is chemically similar to the outer layer. Bonding layers are composed of the materials previously enumerated in connection with Noone '673. U.S. Pat. No. 5,566,720 to Mitchell et al discloses a multi-layer tube in which the bonding layer is a terpolymer containing a polyfluorinated alkylene, an α-fluoro-olefin and a fluorinated vinyl compound.

The use of fluorinated materials such as ethylene chlorotrifluoroethylene copolymers and polyvinylidine fluoride copolymers has accomplished many of the objectives such as reduced hydrocarbon permeation through the tube. However, the need exists for multi-layer tube constructions which achieve hydrocarbon permeation resistance at levels equal to or greater than those achieved by multi-layer tubing constructions containing fluoropolymers. Additionally, the need exists for multi-layer tube constructions which exhibit effective inter-layer lamination and prolonged service life.

It is desirable to provide a multi-layer tube suitable for use in motor vehicles which is durable and can prevent or reduce permeation of organic materials therethrough. It is desirable to provide a multi-layer tube material in which the various layers are uniformly connected to one another in a manner which will prevent or reduce the potential for delamination between layers during the life of the tubing. Finally, it would be desirable to provide a multi-layer tube which would be capable of preventing undesired build up of electrostatic charge and would be capable of safely dissipating any electrostatic charge which may occur.

SUMMARY OF THE INVENTION

The present invention is a multi-layer tube for use in a motor vehicle system to transport fluids containing hydrocarbons such as would be found in a fuel line, a vapor return line or a vapor recovery tube. The elongated multi-layer tube of the present invention includes a first layer radially disposed innermost and having an inner surface capable of prolonged exposure to a fluid containing hydrocarbons. The first layer consists essentially of an extrudable melt-processible thermoplastic material capable of withstanding prolonged exposure to automotive fuel and the various fuel additives. A second layer of the multi-layer tubing is bonded to the first layer. The second layer consists essentially of an extrudable, melt-processible thermoplastic material capable of sufficiently permanent laminar adhesion with the first layer so as to prevent delamination between the first and second layers during a desired lifetime of the tube. The thermoplastic material of the second layer has at least one constituent which is chemically dissimilar from the thermoplastic material employed in the first layer. The multi-layer tube also includes a third layer which is uniformly connected to the second layer. The third layer is composed of an extrudable melt-processible thermoplastic having as a major constituent a thermoplastic material selected from the group consisting of aromatic polyketones, aliphatic polyketones, and mixtures thereof. The multi-layer tube of the present invention may, optionally, include additional layers interposed between the respective layers as well as additional layers which overlie the exterior surface of the third layer.

BRIEF DESCRIPTION OF THE DRAWINGS

The objects, features and advantages of the present invention will become more readily apparent from the following description, reference being made to the following drawings in which.

DESCRIPTION OF THE PREFERRED AND ALTERNATIVE EMBODIMENTS

Figure 1:
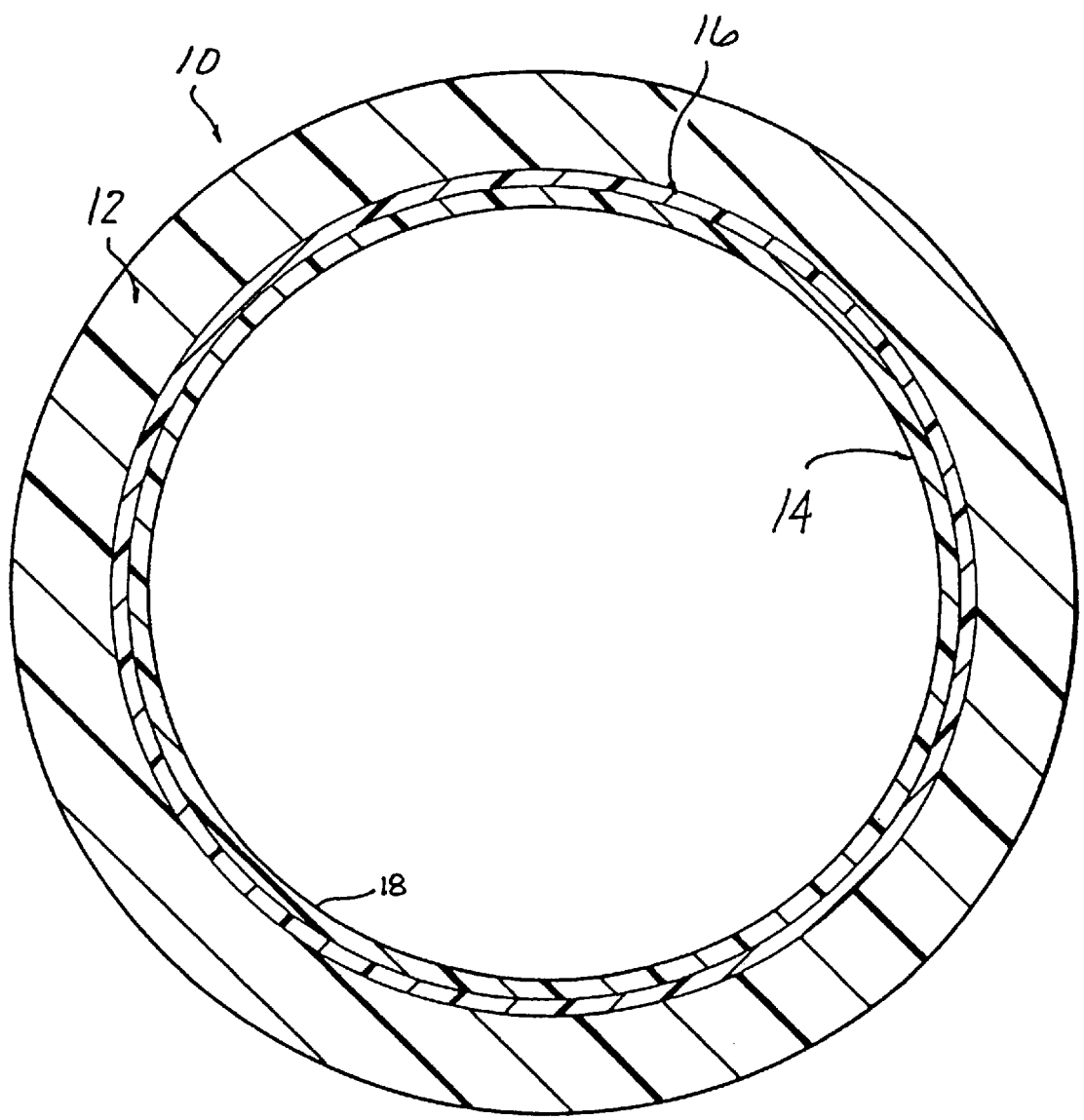
FIG. 1 is a sectional view through multi-layer tube having three layers according to the present invention.

The present invention is a multi-layer fuel line and vapor tube 10 which contains an inner or first layer 14, at least one intermediate or second layer 16 and at least an outer or third layer 12. The tube 10 of the present invention is, preferably, fabricated by co-extruding the given thermoplastic materials in co-extrusion processes. The tubing 10 may either be co-extruded to a suitable length or may be co-extruded in continuous lengths and cut to fit the given application subsequently. In applications such as fuel lines and vapor recovery systems, outer tube diameters up to 63.5 mm (2.5 inches) can be produced with outer diameters of up to 50 mm being preferred.

The multi-layer tube of the present invention may have any suitable wall thickness as desired. In automotive systems such as those described herein, wall thicknesses between 0.5 mm and 2.0 mm are generally employed; with wall thicknesses of approximately 0.8 mm to approximately 1.5 mm being preferred; and wall thicknesses between about 0.8 mm and about 1.25 mm being most preferred. The wall thickness discussed is exclusive of any exterior jacket which may overlie the exterior surface of the tube. It is within the scope of this invention to prepare tube material having a plurality of jacketing layers overlying the enumerated layers of thermoplastic material in the basic tube.

The basic multi-layer tube 10 of the present invention typically has a maximum of five layers inclusive of bonding layers. While multi-layer tube 10 of the present invention typically will have three or four layers, the multi-layer tube 10 of the present invention can include additional layers as desired and technologically permitted. While multi-layer tube having five co-extruded layers is considered to be the general maximum, multi-layer tubes having additional co-extruded layers greater than five is not considered precluded from the scope of this invention if obtainable by appropriate co-extrusion methods.

The multi-layer tube 10 of the present invention comprises a relatively thick outer or third layer 12 which is non-reactive with the external environment and can withstand various shocks, vibrational fatigue and changes in temperature as well as exposure to various corrosive or degradative compounds to which the multi-layer tube 10 would be exposed through the normal course of operation of the motor vehicle. Suitable materials for use in the thick outer layer 12 are generally defined as melt-processible extrudable thermoplastic materials which exhibit sufficient resistance to ultraviolet degradation, extreme changes in temperature and exposure to chemicals typically found in an automotive environment to permit use on an automotive vehicle. Materials of choice can exhibit resistance to environmental hazards such as exposure to zinc chloride and resistance to degradation upon contact with materials such as engine oil and brake fluid. It is to be understood that the relative importance of the various enumerated characteristics such as resistance to specific environmental hazards would depend upon the ultimate location of the multi-layer tube 10 in the automotive vehicle and the relative position of the third layer 12 in the finished tube construction. In situations where the third layer 12 is jacketed or otherwise covered by an additional overlying layer, the relative importance of the intrinsic robustness of the thermoplastic material employed in the third layer 12 may be less than when third layer 12 is to be the radially outermost layer.

It is generally anticipated that the thermoplastic material employed in the third layer 12 will be suitable to provide a multi-layer tube use at an outer service temperature range between about −40° C. and about 150° C., with a range of −20° C. to 120° C. being preferred. Multi-layer tube 10 of the present invention, preferably, has a tensile strength of no less than 25 N/mm$^2$ and an overall elongation value at break of at least 150%. The multi-layer tube 10, preferably, has a burst strength at 23° C. and 120° C. of at least 20 bar. The multi-layer tube 10 is resistant to exposure to brake fluid, engine oil and peroxides such as those which may be found in gasoline. Multi-layer tube 10, in general, exhibits appropriate impact resistance at service temperatures as low as −20° C. with impact resistance to −40° C. being preferred. As used herein, the term "impact resistance" is defined as the ability of a thermoplastic to withstand impacts of at least 2 foot pounds at temperatures below about −20° C. with ability to withstand impacts of at least 2 foot pounds at temperatures to about −40° C. being preferred. Impact resistance as defined herein is tested according to the Method for Impact Resistance Determination defined in SAE J2260 (Nov. 1, 1997). It is generally believed that these characteristics are due entirely or in large part to the thermoplastic material employed in the third layer 12, however, it is within the purview of this invention that additional layers interior to the third layer 12 can contribute to total impact resistance of the tube.

In the multi-layer tube 10 of the present invention, the various layers of tube 10 are integrally laminated to one another to provide the resulting multi-layer unit. The various layers are resistant to delamination throughout the lifetime of the multi-layer tube 10.

The multi-layer tube 10 of the present invention includes first layer 14 disposed radially innermost in the multi-layer construction. The first or inner layer 14 has an inner surface 18 capable of prolonged exposure to a fluid containing hydrocarbons. Preferably, the first layer 14 consists essentially of a melt-processible thermoplastic which has, as a major constituent, a ketone-based thermoplastic material selected from the group consisting of aromatic polyketones, aliphatic polyketones, and mixtures thereof.

The thermoplastic material of the inner layer 14 can be composed of an aromatic polyketone material such as polyaryletherketones. Suitable polyaryletherketones include polyetherketones (PEK) having the general formula:
and polyetheretherketones (PEEK) having the general formula:
These materials are generally referred to as aromatic polyketones. Such materials typically have a melt range between about 715° to 750° F. for PEEK and 735° to 805° F. for PEK. Typical physical properties are outlined in Table I. Such materials are commercially available from various sources such as Amoco Performance Polymers under the tradename KADEL; DuPont under the tradename ARETONE, ICI Chemicals under the tradename VICTREX, and BASF under the tradename ULTRAPEK.

The thermoplastic material of the inner layer can also be composed of aliphatic ketone material. Suitable aliphatic ketone materials are outlined in U.S. Pat. No. 5,135,976 to Van Helden et al, the specification of which is incorporated by reference herein. Suitable materials have the general physical characteristics outlined in Table II and are commercially available from Shell Oil Company of Houston, Tex. under the tradename CARILON. One such aliphatic polyketone which can successfully be employed in the first layer 14 of the present invention is CARILON DP 1000.

With regard to polyaromatic ketones, it was previously believed that such materials possessed elongation characteristics which rendered them unsuitable for multi-layer tubing applications. However, it has been discovered that incorporation of aromatic polyketone thermoplastic material into the first layer 14 of the multi-layer tubing 10 of the present invention does not significantly compromise the ultimate elongation characteristics of the resulting multi-layer tube 10, currently specified as having an elongation at break of at least 150%.

The use of aromatic or aliphatic polyketone thermoplastic material in the inner layer provides unexpected increases in fuel impermeability characteristics of the resulting multi-layer tube 10. It is believed that the hydrocarbon impermeability characteristics exhibited by the multi-layer tube 10 of the present invention are more than a result of the chemical resistance characteristics which may be inherent in the various polyketone materials. Without being bound to any theory, it is believed that increased hydrocarbon impermeability of the resulting multi-layer tue 10 is due to a synergistic effect resulting from the multiple bonded layers.

The multi-layer tube 10 of the present invention also includes a second layer 16 which is located radially outward of and uniformly connected to the first layer 14. The second layer 16 consists essentially of an extrudable melt-processable thermoplastic material which is capable of sufficiently permanent laminar connection with the first layer 14 so as to prevent delamination from the first layer during the desired lifetime of the multi-layer tube 10. The thermoplastic material employed in the second layer 16 has at least one constituent which is chemically dissimilar from the thermoplastic material employed in the first layer. The term "chemically dissimilar" as used herein is defined as meaning a polymeric material which is from a different chemical family from the major constituent of the first layer 14. Thus, the first layer 14 is composed of a thermoplastic material which contains a major constituent selected from the group consisting of a polyketone selected from the group consisting of aliphatic polyketones, aromatic polyketones, and mixtures thereof. The second layer 16 is composed of a thermoplastic material having at least one constituent which is a nonpolyketone material.

The thermoplastic material employed in the second layer 16 is capable of establishing a chemical bond between thermoplastic coextruded layers which are radially interior and exterior thereto. Ideally, the thermoplastic material employed in the second layer 16 also exhibits resistance to permeation of fuel components. The material may or may not include various plasticizers or other modifying agents.

The thermoplastic material employed in the second layer 14 is, preferably, a polymeric alloy or blend of polyketone and other suitable thermoplastic materials. One such blend would comprise (a) a major portion of a linear alternating polymer of carbon monoxide and at least one ethylinically unsaturated hydrocarbon eg. an aliphatic polyketone, and (b) a lesser amount of a polymeric polyamide. The thermoplastic material employed in the second layer may also include other constituents in proportions lesser than the polyketone. These can include acidic polymers of an alpha-olefin and an alpha,beta-ethylenically unsaturated carboxylic acid and carboxylated partially hydrogenated alkadiene. Suitable materials are discussed in U.S. Pat. No. 5,039,743 to Machado; U.S. Pat. No. 5,043,389 to Gergen et al; U.S. Pat. No. 5,084,518 to George et al, the specifications of which are incorporated herein by reference.

The third layer 12 is uniformly connected to the second layer and consists essentially of an extrudable melt-processable thermoplastic having as a major constituent a thermoplastic material selected from the group consisting of polyethylene, polyamides, and mixtures thereof.

Suitable polyamides include aliphatic homopolycondensates and copolycondensates. The suitable polyamides include nylon 4,6, nylon 6,6, nylon 6,12, nylon 8,10, nylon 10,10, nylon 6, nylon 10,12, nylon 11, nylon 12 and nylon 12,12, and mixtures thereof. The preferred polyamide materials employed in the third layer 14 are selected from the group consisting of nylon 6, nylon 6,6, nylon 10,12, nylon 11, nylon 12,12, nylon 12 and mixtures thereof. The identification of these polyamides corresponds to international specifications in which the first numeral provides the number of carbon atoms in the starting diamine and the last numeral provides the number of carbon atoms in the dicarboxylic acid. In instances where only one number is quoted, the starting substance was an $\alpha$, $\omega$ aminocarboxylic acid or the lactam derived therefrom.

Copolyamides may be used and may be prepared from adipic acid, sebacic acid, suberic acid, isophthalic acid, terephthalic acid as coess acid or bis(4-aminocyclohexyl)-methane, trimethylhexamethylenediamine, hexamethylenediamine or similar codiamine selected from the group consisting of nylon 12, nylon 11, nylon 6, nylon 6,6 and mixtures thereof.

In the preferred embodiment, the third layer 12 consists essentially of a polyamide selected from the group consisting of nylon 11, nylon 12, nylon 6, nylon 6.6 and mixtures thereof; with nylon 12 being most preferred among the polyamides.

It is anticipated that the thermoplastic polyamide material employed in the third layer 12 may be either unmodified or modified to include various plasticizers, impact modifiers, etc. The thermoplastic material of choice will generally have an elongation at break of at least 150% and an ability to withstand impacts of at least 2 foot-pounds at temperatures below about $-20°$ C. as measured by the method outlined in SAE J2260 (Nov. 1, 1997). Various other materials may be added as necessary to increase resistance to ultraviolet degradation, exposure to environmental hazards such as zinc chloride, and degradation upon contact with engine oil and brake fluid. Suitable impact modifying polymers include but are not limited to, ethylene/propylene copolymers or ethylene/propylene/diene copolymers.

In instances in which nylon 6 is employed, it is anticipated that the nylon 6 would either inherently exhibit zinc chloride resistance or would contain sufficient quantities of modifying agents to impart a level of zinc chloride resistance greater than or equal to that required by performance requirement 9.5 as outlined in SAE standard J2260; i.e. non-reactivity after 200 hour immersion in a 50% by weight zinc chloride solution. The nylon 6 which would be employed in the third layer 14 of the multi-layer tubing 10 of the present invention can also be modified with various plasticizers, flame retardants and the like in manners which would be known to those skilled in the art.

Suitable thermoplastic polyethylene materials which can be employed in the third or outer layer 14 are melt processible high density polyethylene (HDPE) characterized as a linear polyethylene having a density approximately above 0.940. Suitable polyethylene thermoplastic has a melt temperature between about $125°$ and about $135°$ C. and an extrusion processing temperature between about $300°$ C. and about $525°$ C. and material with which the polyethylene may be copolymerized. Typical properties are outlined in Table III.

The high density polyethylene thermoplastic material can be selected from the group consisting of homopolymers of polyethylene, rubber modified polyethylene, copolymers of high density polyethylene of low and medium molecular weight; copolymers of high molecular weight polyethylene, and mixtures thereof.

It is understood that high density polyethylene thermoplastic material employed in the third or outer layer 12 can include various modifiers and additives such as heat and light stabilizers, flame retardants and pigments as well as stabilizers such as antioxidants, UV stabilizers, flame retardants, pigments and the like.

Suitable high density polyethylene materials are commercially available from a variety of sources such as Petrothene (TM) by Quantum.

Figure 2:
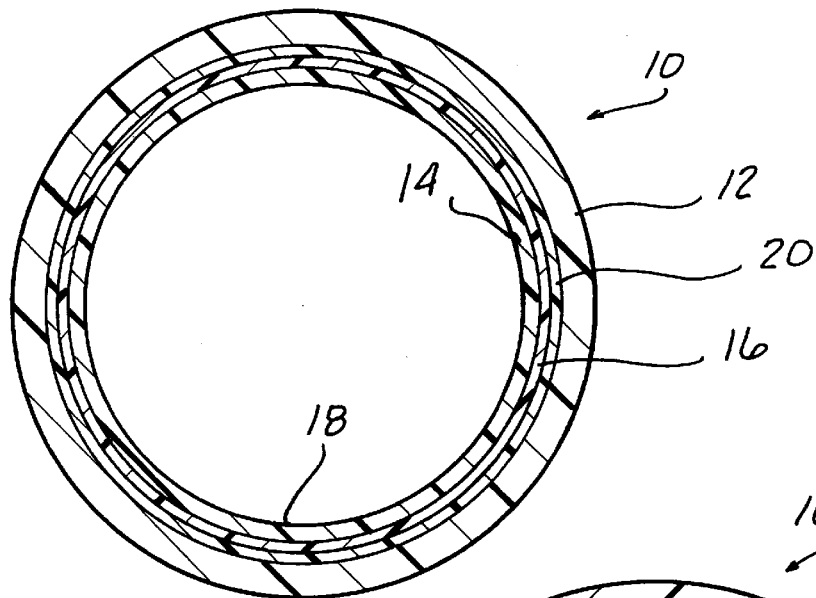
FIG. 2 is a sectional view through tube having the three layers according to the present invention depicted in FIG. 1 with an additional intermediate bonding layer interposed between the second and third layers.

The elongated multi-layer tube 10 of the present invention may also include at least one intermediate bonding layer 20 interposed between either the first layer 14 and second layer 16 or the third layer 14 and second layer 16. It is also within the purview of this invention that the multi-layer tube 10 of the present invention include at least one intermediate bonding layer interposed between both the first layer 14 and the second layer 16 and between the second layer 16 and the third layer 14. As depicted in FIG. 2, one intermediate bonding layer 20 is interposed between second layer 16 and third layer 12. The intermediate bonding layer 20 is composed of a suitable melt-processible thermoplastic material capable of suitable laminar adhesion with underlying and overlying layers. Preferably, the intermediate bonding layer or layers consists essentially of a melt-processible thermoplastic selected from the group consisting of polyvinylidine fluoride, polyvinyl fluoride, copolymers of ethylene tetrafluoroethylene, blends of urethane and polyvinyl acetate, and mixtures thereof.

Figure 3:
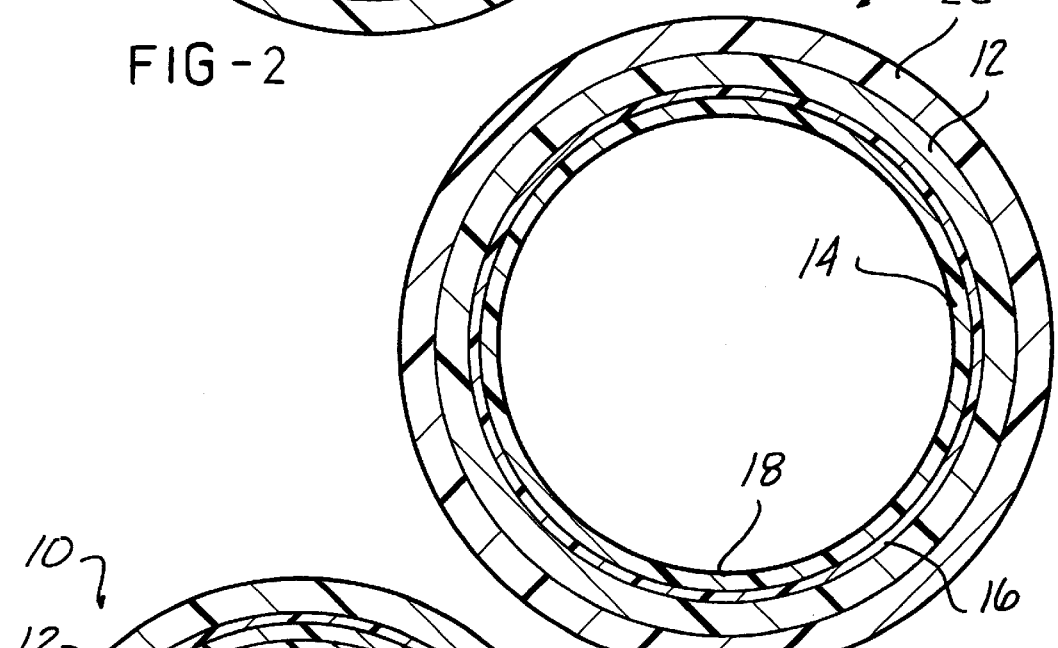
FIG. 3 is a sectional view through tube of FIG. 1 having an additional exterior jacket layer according to the present invention.

The tube 10 of the present invention may also, optionally, include an outer jacket 22 which surrounds the third or outer layer 12 as shown in FIG. 3. The jacket 22 may either be coextruded with the other layers during the extrusion process or may be added in a subsequent process such as by cross head extrusion. The outer jacket 22 may be made of any material chosen for its structural or insulating characteristics and may be of any suitable wall thickness. In the preferred embodiment, the outer jacket 22 may be made of a thermoplastic material selected from the group consisting of zinc-chloride resistant nylon 6, nylon 6.6, nylon 11, nylon 12, polypropylene, thermoplastic elastomers and mixtures thereof. Suitable thermoplastic elastomers are commercially available from Advanced Elastomeric Systems of St. Louis, Mo. under the tradename SANTOPRENE, from Shell Chemical Co. of Houston, Tex. under the tradename KRATON from Novacor Chemicals, Leominster, Mass. under the tradename SARLINK and from Vichem Corporation of Allendale, Mich. under the tradename VICHEM.

When desired, the multi-layer tube 10 of the present invention may be suitably provided so that at least one layer exhibits conductive characteristics rendering the multi-layer tube 10 capable of dissipating electrostatic charge which builds up in the tube during use. When electrostatic dissipative characteristics are desired, it is preferred that one of the inner layers exhibit electrostatic dissipative characteristics. It is most preferred that the radially innermost fuel contacting layer exhibit electrostatic dissipative characteristics.

As used herein, "electrostatic dissipative characteristics" is the ability of the material to dissipate electrostatic charge which builds up in the multi-layer tube. This ability can be thought of as a quantification of the ease that electrical charges can move in a given material. In fuel automotive system components, the electrostatic dissipative characteristics of materials are differentiated on the basis of measured surface resistivity value (expressed as "ohms per square" (ohm/square). "Surface resistivity" of a material is resistance as measured multiplied by the ratio of specimen surface dimensions (width of electrodes defining the current path divided by the distance between electrodes) which transforms the measured resistance to that obtained if the electrodes formed the opposite sides of a square. The unit of measurement is defined generally as ohms per square (ohm/square).

$$R_s = R \cdot \frac{\pi \cdot d}{L}$$

where R is measured resistance; d is tube ID; and L is the distance between electrodes.

When electrostatic dissipative characteristics are desired, the multi-layer tube 10 of the present invention will include at least one layer in which the electrostatic dissipation capacity of that layer is sufficient to leak electrical charge at a level approximately equal to or greater than the rate at which electrostatic charge builds up or accumulates in the tube.

Electrostatic charge accumulation is the phenomenon during which charge accumulates in areas of flow transition causing localized charge imbalance. If unchecked, the imbalance continues to grow until either the rate of dissipation equals the rate of accumulation or some limiting mechanism such as electrical discharge occurs to cause the level of charges to become balanced or, at the minimum, reduced. Electrostatic dissipation is the action of unbalanced charge being reduced through conduction to ground. The polymeric material employed in the electrostatic dissipation layer is, preferably, one which can be defined as having electrical characteristics as "moderately conductive" or "sufficiently dissipative". As used herein, the term "moderately conductive" is defined as a measurement of surface resistance levels between about $1 \times 10^4$ ohms/square and about $1 \times 10^6$ ohms/square. As used herein, the term "sufficiently dissipative" as having a measured surface resistant level of greater than $1 \times 10^6$ ohms/square but less than about $1 \times 10^{10}$ ohms/square.

The polymeric material employed in the layer capable of electrostatic dissipation, referred herein as the "conductive layer" of the present invention may exhibit inherent qualities of electrostatic dissipation or, preferably, may include in its composition a conductive medium in sufficient quantity to permit electrostatic dissipation in the desired range. The conductive medium may be any suitable material of a composition in shape capable of effecting this electrostatic dissipation. The conductive material may be selected from the group consisting of elemental carbon, stainless steel, highly conductive metals such as copper, silver, gold, nickel and silicon, and mixtures thereof. The term "elemental carbon" as used herein is employed to describe and include materials commonly referred to as "carbon black". Carbon black as defined herein is a finely divided form of carbon produced by burning vaporized heavy oil fraction with sufficient air for complete combustion. Carbon black can also be made from methane or natural gas by cracking or direct combustion. The carbon black can be present in the form of carbon fibrous, spheres and the like.

The amount of conductive material contained in the thermoplastic, if necessary, can be limited by considerations of low temperature durability and resistance to the degradative effects of the gasoline or fuel passing through the multi-layer tube 10. In the preferred embodiment, the thermoplastic material contains conductive material in an amount sufficient to provide a surface resistivity less than $1 \times 10^6$ ohm/square. Generally speaking, the maximum amount of conductive material employed in the thermoplastic is less than about 7% by volume with a concentration between about 2% and about 4% by volume being preferred. The conductive material can be either blended into the melt-processible thermoplastic so as to be interstitially integrated into the crystalline structure of the polymer, or it can be incorporated during polymerization of the monomers that make up the thermoplastic material. Without being bound to any theory, it is believed that carbon-containing materials such as carbon black may be incorporated during co-polymerization of the surrounding thermoplastic material. Materials such as stainless steel are more likely to be blended into the crystalline structure of the polymer. In the preferred embodiment, the electrostatic dissipation capacity as measured in surface resistivity is less than $1 \times 10^6$ ohms/ square as determined by the method for measuring and calculating surface resistance is set forth in SAE J2260.

It is to be understood that electrostatic dissipation capacity can also be expressed in terms of volume resistance; a measurement which recognizes that conduction through the bulk of the material can contribute to reduction of charges that have built up as well as the surface dissipation. Volume resistance is relatable to surface resistance levels but is dependent upon geometry. It is also possible to quantify electrostatic dissipation in terms of rate of charge dissipation. This can be determined by following a procedure such as the one defined by MIL-B-81705 B. As with volume resistance, the actual time for charge to decay that is used to define the three terms is dependent upon geometry. Such correlations can be readily ascertained by the skilled artisan.

Figure 4:
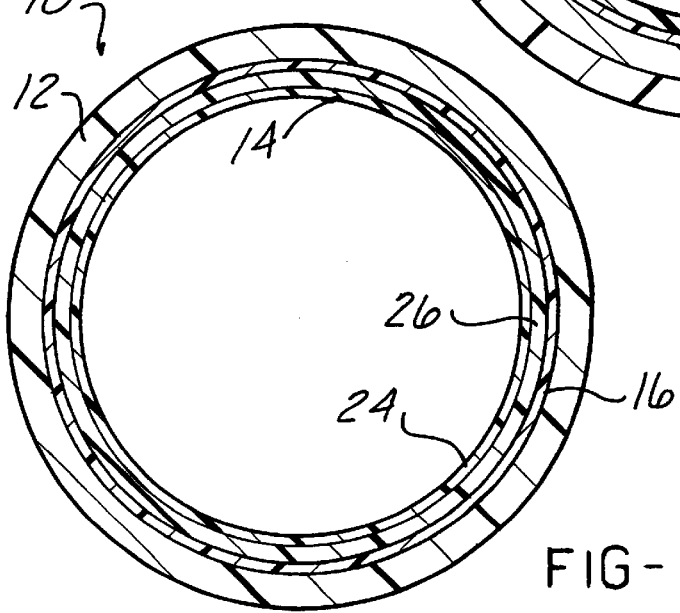
FIG. 4 is a sectional view through multi-layer tube of the present invention in which the radially innermost layer is composed of two sublayers.

It is also within the scope of this invention that the multi-layer tube 10 of the present invention may have a construction such as that shown in FIG. 4 in which the first layer 14 is composed of at least two sublayers. The first and second sublayers 24, 26 composed of thermoplastic materials which are chemically similar to one another. Preferably, in such embodiments, the first layer 14 comprises a first sublayer 24 disposed radially innermost having a predetermined first radial thickness and an inner surface capable of prolonged exposure to a fuel containing hydrocarbon. The first layer also includes a second sublayer 26 having a predetermined second radial thickness. The second predetermined radial thickness is at least equal to or greater than the predetermined radial thickness of the first sublayer 24. The second sublayer is uniformly connected to the first sublayer. Preferably at least one sublayer 24, 26 is capable of dissipating electrostatic charge in the manner described previously; with the first sublayer 24 being preferred.

The first and second sublayers are generally composed of the same or similar melt-processible extrudable thermoplastic materials with the significant difference being the electrostatic dissipation capacity.

While preferred embodiments, forms an arrangement of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

TABLE I

TYPICAL PROPERTIES OF AROMATIC POLYKETONES

| | PAEK |
|---|---|
| Melting Point | 381° C. |
| Processing Temp. | 415° C. |
| Density | 1.3 g/cm$^3$ |
| Elongation at break | 30% |
| Hardness | D86 (Shore) |
| Volume resistivity | $1.0 \times 10^{16}$ ohm.cm |

TABLE II

TYPICAL PROPERTIES OF ALIPHATIC POLYKETONES

| Processing temperature | 260° C. |
|---|---|
| Melting Point | 220° C. |
| Density | 1.24 g/cm$^3$ |
| Tensile strength (break) | 562 kg/cm$^2$ |
| Elongation, break | 300% |
| Hardness | R105 (Rockwell) |
| Volume resistivity | $3.40 \times 10^{13}$ ohm.cm |

TABLE III

TYPICAL PROPERTIES OF HIGH DENSITY POLYETHYLENE

| PROPERTIES | ASTM TEST METHOD | POLYETHYLENE HOMOPOLYMER | RUBBER MODIFIED POLY-ETHYLENE | LOW & MEDIUM MOLECULAR WEIGHT COPOLYMER | HIGH MOLECULAR WEIGHT COPOLYMER |
|---|---|---|---|---|---|
| Melting Temp. ° C. | | 130–137 | 122–127 | 125–132 | 125–135 |
| Tensile strength at break, p.s.i. | D638 | 3200–4500 | 2300–2900 | 3000–6500 | 2500–4300 |
| Elongation at break, % | D638 | 10–1200 | 600–700 | 10–1300 | 170–800 |
| Tensile yield strength, p.s.i. | D638 | 3800–4800 | 1400–2600 | 2600–4200 | 2800–3900 |
| Hardness Shore/Barcol D2240/ | | Shore D66-73 | Shore D55-60 | Shore D58-70 | Shore D63-65 |
| Specific Gravity | D792 D2583 | 0.952–0.965 | 0.92–0.939 | 0.939–0.960 | 0.974–0.955 |

What is claimed is:
1. An elongated multi-layer tube comprising:
a first layer disposed radially innermost having an inner surface capable of prolonged exposure to a fluid containing hydrocarbons, the first layer consisting essentially of a melt-processible thermoplastic selected from the group consisting of aromatic polyketones having a defined backbone, the aromatic polyketone having aromatic functional groups present in the defined backbone, the aromatic polyketone selected from the group consisting of polyetherketones, polyetheretherketones, and mixtures thereof;

a second layer uniformly connected to the first layer, the second layer consisting essentially of an extrudable, melt-processable thermoplastic material capable of sufficiently permanent laminar connection with the first layer so as to prevent delamination from the first layer during a desired lifetime of the tube;

a third layer uniformly connected to the second layer, the third layer consisting essentially of an extrudable melt-processable thermoplastic having as a major constituent a thermoplastic material selected from the group consisting of polyamides, high density polyethylenes and mixtures thereof.

2. The elongated multi-layer tube of claim 1 wherein thermoplastic material employed in the second layer consists essentially of polymeric material composed of a melt-processable polyketone and a polymer selected from the group consisting of polyamides, high density polyesters and mixtures thereof.

3. The elongated multi-layer tube of claim 2 wherein the melt-processable polyketone material employed in the second layer is selected from the group consisting of aromatic polyketones.

4. The elongated multi-layer tube of claim 3 wherein the polyamide employed in the second layer is selected from the group consisting of Nylon 12, Nylon 11, Nylon 6, Nylon 10,12, and mixtures thereof.

5. The elongated multi-layer tube of claim 1 wherein the melt-processable thermoplastic material employed in the first layer is selected from the group consisting of polyarylether ketones.

6. The elongated multi-layer tube of claim 2 wherein at least one layer is capable of dissipating electrostatic charge in a range less than $1\times10^6$ ohm/square.

7. The elongated multi-layer tube of claim 6 wherein at least the radially innermost layer is capable of dissipating electrostatic charge.

8. The elongated multi-layer tube of claim 2 wherein at least one layer contains conductive media in a quantity to dissipate sufficient electrostatic charge to prevent a discharge event.

9. The elongated multi-layer tube of claim 8 wherein at least one layer contains less than about 7% by volume conductive media selected from the group consisting of copper, silver, gold, nickel, silicon, carbon black, and mixtures thereof.

10. The elongated multi-layer tube of claim 1 wherein the thermoplastic material employed in the second layer consists essentially of a melt-processable polymeric material comprising:
a) a major portion of an aromatic polyketone selected from the group consisting of polyetherketones, polyetheretherketones, and mixtures thereof; and
b) a lesser amount of a polymer selected from the group consisting of polyamides, high density polyethylene and mixtures thereof.

11. The elongated multi-layer tube of claim 10 wherein the melt-processable thermoplastic material employed in the second layer comprises between about 30 and about 70% by volume linear alternating polymer and between about 70 and about 30% by volume of a compound groups.

12. The elongated multi-layer tube of claim 11 wherein the polyamide employed in the second layer is selected from the group consisting of Nylon 11, Nylon 12, Nylon 6 and mixtures thereof.

13. The elongated multi-layer tube of claim 12 wherein at least one layer is capable of dissipating electrostatic charge in an amount less than about $1\times10^6$ ohm/square.

14. The elongated multi-layer tube of claim 13 wherein at least the first layer is capable of dissipating electrostatic charge.

15. The elongated multi-layer tube of claim 13 wherein at least one layer contains conductive media in a quantity to dissipate sufficient electrostatic charge to prevent a discharge event.

16. The elongated multi-layer tube of claim 15 wherein at least one layer contains less than about 7% by volume conductive media selected from the group consisting of copper, silver, gold, nickel, silicon, carbon black, and mixtures thereof.

17. The elongated multi-layer tube of claim 14 wherein the first layer comprises:

a first sublayer disposed radially innermost having a predetermined first radial thickness and an inner surface capable of prolonged exposure to a fluid containing hydrocarbons; and a second sublayer having a predetermined second radial thickness, the second predetermined thickness being at least equal to the first predetermined radial thickness, the second sublayer uniformly connected to the first sublayer;

wherein at least the first sublayer is capable of dissipating electrostatic charge in an amount less than $1\times10^6$ ohm/square.

18. The elongated multi-layer tube of claim 10 wherein the melt-processable thermoplastic material employed in the second layer comprises between about 30 and about 70% by volume aliphatic polyketones in combination with said aromatic polyketones and between about 70 and about 30% by volume of a compound selected from the group consisting of polyamides, high density polyethylene, and mixtures thereof.

19. An elongated multi-layer tube comprising:

a first layer disposed radially innermost having an inner surface capable of prolonged exposure to a fluid containing hydrocarbons, the first layer consisting essentially of a melt-processable thermoplastic;

a second layer uniformly bonded to the first layer, the second layer consisting essentially of an extrudable, melt-processable thermoplastic material capable of sufficiently permanent laminar connection with the first layer so as to prevent delamination from the first layer during a desired lifetime of the tube, wherein the thermoplastic material consists essentially of;
a) a major portion of an aromatic polyketone selected from the group consisting of polyether ketones having the general formula:

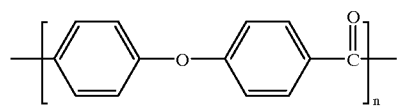

polyetheretherketones having the general formula:

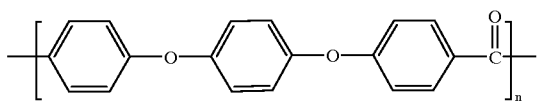

and mixtures thereof; and
b) a thermoplastic compound selected from the group consisting of polyamides, high density polyethylene and mixtures thereof;
a third layer uniformly connected to the second layer, the third layer consisting essentially of an extrudable melt-processible thermoplastic having as a major constituent a thermoplastic material selected from the group consisting of polyamides, high density polyethylene and mixtures thereof.

20. The elongated multi-layer tube of claim 19 wherein the melt-processible thermoplastic material employed in the second layer comprises between about 30 to about 70% by aromatic polyketone and between about 70 to about 30% by volume of a compound selected from the group consisting of polyamides, high density polyethylene, and mixtures thereof.

21. The elongated multi-layer tube of claim 20 wherein the second constituent of the thermoplastic material of the second layer is polyamide selected from the group consisting of Nylon 11, Nylon 12, Nylon 6 and mixtures thereof.

22. The elongated multi-layer tube of claim 19 wherein the thermoplastic material employed in the first layer is selected from the group consisting of aromatic polyketones.

23. The elongated multi-layer tube of claim 22 wherein the thermoplastic material employed in the first layer is a polyarylether ketone selected from the group consisting of polyetherether ketones having the general formula:

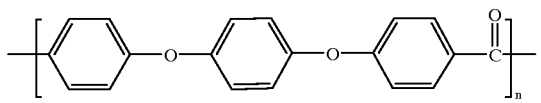

polyether ketones having the general formula:

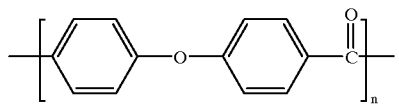

and mixtures thereof.

24. The elongated multi-layer tube of claim 23 wherein the aromatic polyketone material is in combination with a melt stabilized copolymer comprising a major amount of an alternating copolymer of carbon monoxide with one or more olefinically unsaturated compounds and a melt stabilizing amount of a glycidylether which comprises per molecule at least one epoxy group and at least functional group selected from primary alcoholic hydroxy groups and ketonic carbonyl groups.

25. The elongated multi-layer tube of claim 20 wherein at least one layer is capable of dissipating electrostatic charge in a range less than $1 \times 10^6$ ohm/square.

26. The elongated multi-layer tube of claim 25 wherein at least one layer contains conductive media in a quantity to dissipate sufficient electrostatic charge to prevent a discharge event.

27. The elongated multi-layer tube of claim 20 wherein at least one layer contains less than about 7% by volume conductive media selected from the group consisting of copper, silver, gold, nickel, silicon, carbon black, and mixtures thereof.

28. The elongated multi-layer tube of claim 25 wherein at least the first layer is capable of dissipating electrostatic charge.

29. The elongated multi-layer tube of claim 25 wherein the first layer comprises:
a first sublayer disposed radially innermost having a predetermined first radial thickness and an inner surface capable of prolonged exposure to a fluid containing hydrocarbons; and
a second sublayer having a predetermined second radial thickness, the second predetermined thickness being at least equal to the first predetermined radial thickness, the second sublayer uniformly connected to the first sublayer;
wherein at least the first sublayer is capable of dissipating electrostatic charge.

30. The elongated multi-layer tubing of claim 5 wherein the polyaryletherketone ketone of the first layer is selected from the group consisting of polyetheretherketones having the general formula:

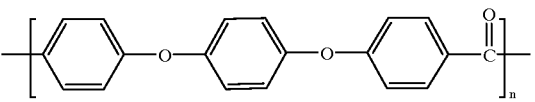

polyether ketones having the general formula:

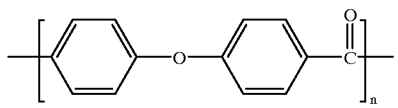

and mixtures thereof.

31. The elongated multi-layer tube of claim 30 wherein the thermoplastic material of the first layer also comprises aliphatic polyketones in combination with the aromatic polyketones.

* * * * *